United States Patent
Eytchison et al.

(10) Patent No.: US 8,706,677 B2
(45) Date of Patent: *Apr. 22, 2014

(54) METHODS AND APPARATUS FOR DETERMINING AN IDENTITY OF A USER

(75) Inventors: Edward Eytchison, Milpitas, CA (US); Dan M Phan, San Jose, CA (US); Nisha Srinivasan, Santa Clara, CA (US); Saket Kumar, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 653 days.

This patent is subject to a terminal disclaimer.

(21) Appl. No.: 12/543,250

(22) Filed: Aug. 18, 2009

(65) Prior Publication Data

US 2009/0307182 A1 Dec. 10, 2009

Related U.S. Application Data

(63) Continuation of application No. 10/763,654, filed on Jan. 22, 2004, now Pat. No. 7,594,121.

(51) Int. Cl.
G06F 17/00 (2006.01)
G06N 7/04 (2006.01)

(52) U.S. Cl.
USPC ............................................................ 706/54

(58) Field of Classification Search
USPC ............................................................ 706/54
See application file for complete search history.

(56) References Cited

U.S. PATENT DOCUMENTS

| | | | |
|---|---|---|---|
| 6,188,777 B1 | 2/2001 | Darrell et al. | |
| 6,327,346 B1 | 12/2001 | Infosino | |
| 6,445,810 B2 | 9/2002 | Darrell et al. | |
| 2001/0026632 A1* | 10/2001 | Tamai | 382/116 |
| 2003/0037251 A1* | 2/2003 | Frieder et al. | 713/200 |
| 2003/0083938 A1* | 5/2003 | Smith et al. | 705/14 |
| 2004/0003294 A1* | 1/2004 | Moore | 713/202 |

OTHER PUBLICATIONS

Teng, Henry et al "Adaptive Real-time Anomaly Detection Using Inductively Generated Sequential Patterns" IEEE 1990 [Online] Downloaded May 9, 2013 http://ieeexplore.ieee.org/stamp/stamp.jsp?tp=&arnumber=63857.*

Lea, Gibbs, Dara-Abrams, Eytchinson; Networking Home Entertainment Devices with HAVi, Sony IEEE, year 2000.

Eytchinson, ThPM 17.6 An Audio-video Content Abstraction Program Interface (CAPI) for Home Network Applications, Sony, IEEE, year 2001.

Gutleber et al., Software Architecture for Processing Clu8sters Based on 12O; Cluster Computing 5, 55-64, year 2002.

Integrated person tracking using stereo, color and pattern detection Darrell, T.; Gordon, G.; Harville, M.; Woodfill, J.; Computer Vision and Pattern Recognition, 1998. Proceedings. 1998 IEEE Computer Society Conference on Jun. 23-25, 1998 pp. 601-608.

(Continued)

*Primary Examiner* — Ben Rifkin
(74) *Attorney, Agent, or Firm* — Haverstock & Owens LLP

(57) ABSTRACT

Methods and apparatuses for determining the identity of the user detect a current user's electronic device activity pattern; compare the detected activity pattern against a plurality of user action identification profiles, wherein each user action identification profile is associated with a particular user; and use the comparing to identify the current user as being the particular user.

23 Claims, 6 Drawing Sheets

(56) References Cited

OTHER PUBLICATIONS

"Context Tailor: Towards a Programming Model for context-Aware Computing," Davis; Sow, Blount, Ebling, 1st International ACM Workshop on Middleware for Pervasive and Ad-Hoc Computing, Jun. 2003.

A network authentication system with multi-biometrics Seno, S.; Sadakane, T.; Baba, Y.; Shikama, T.; Koui, Y.; Nakaya, N.; Communications, 2003. APCC 2003. The 9th Asia-Pacific Conference on vol. 3, Sep. 21-24, 2003 pp. 914-918 vol. 3.

Human activity detection and recognition for video surveillance Wei Niu; Jiao Long; Dan Han; yuan-Fang Wang; Multimedia and Expo, 2004. ICME '04. 2004 IEEE International Conference on vol. 1, Jun. 30-30, 2004 pp. 719-722 vol. 1.

Metadata for anomaly-based security protocol attack deduction Leckie, T.; Yasinsac, A.; Knowledge and Data Engineering, IEEE Transactions on vol. 16, Issue 9, Sep. 2004 pp. 1157-1168.

Virtual perimeter security (VPS) in a physical protection system Norman, B.C.; Adams, D.G.; Aerospace and Electronic Systems Magazine, IEEE vol. 22, Issue 4, Apr. 2007 pp. 30-33.

* cited by examiner

METHODS AND APPARATUS FOR DETERMINING AN IDENTITY OF A USER

FIELD OF INVENTION

The present invention relates generally to identifying electronic device users and, more particularly, to identifying users by user activity patterns.

BACKGROUND

Determining an electronic device user's correct identity is useful for security and customization purposes. Once a user's identity is known, for example, the electronic device (e.g., a personal computer, a personal digital assistant) can be customized specifically for the identified user. Frequently accessed websites can be stored as "favorites" within a web browser, and frequently accessed content selections can be presented to the user in a drop down menu.

In addition, a third party (e.g., content provider, user supervisor) can control access to certain content and application programs based on the device user's identity.

There are a variety of ways to identify an electronic device user, including password, personal identification number (PIN), and biometric parameter (e.g., fingerprint, iris scan, DNA sample). But users typically find that it is inconvenient to remember a password or PIN, and measuring a biometric parameter requires equipment in addition to the electronic device being used.

SUMMARY

Methods and apparatuses for determining the identity of the user detect a current user's electronic device activity pattern; compare the detected activity pattern against a plurality of user action identification profiles, wherein each user action identification profile is associated with a particular user; and use the comparing to identify the current user as being the particular user.

In one illustrative embodiment, a module monitors a current user's electronic device inputs to determine the current user's idiosyncratic activity pattern. If the detected activity pattern is deemed sufficiently close to a historic, idiosyncratic activity pattern associated with a particular user, then the current user is identified as the historic, particular user. Monitored activity patterns include one or a combination of the user's selected content, the user's manner of selecting the content, and/or the context in which the user makes certain inputs.

In some instances, the module monitors for the type of content a user selects for output, and for the order in which the user selects the content. For example, one user may select two or more recorded songs for output in a particular and historically consistent order.

In some instances, the module monitors for the ordered manner in which a user selects a desired output. For example, one user may consistently select a particular song by first selecting a music genre category, then by selecting an album that contains the song, and then by finally selecting the song. Another user, however, may consistently select the particular song by first selecting a music artist category, then by selecting the artist's album that contains the song, and then by finally selecting the song.

In still other instances, the module monitors the physical manner in which the user operates the electronic device. For example, two users will each dial a particular telephone number in a slightly different way. Two users will each make keypad inputs at different speeds. There will be small but measurable consistent delay patterns between keypad inputs. One user may habitually use two hands to operate a cellular telephone keypad (e.g., hold with left hand; dial with right index finger). Another user may habitually operate the cellular telephone keypad with a single hand (e.g., hold with right hand; dial with right thumb). Therefore, the module monitors the durations and intervals of a user's keypad input patterns. The differences in the physical manner of the inputs help identify the current user.

In yet other instances, the module monitors for a context in which the user operates the electronic device. Certain users are likely or unlikely to make certain inputs. For example, a cellular telephone is accessed by dialing its unique telephone number. The cellular telephone, and its telephone number, are typically associated with a particular person. If at a central location the module monitors the unique telephone number being dialed, then since people rarely telephone themselves there is a low probability that the user dialing the telephone number is the particular person associated with unique telephone number.

A user identification system stores one or more historic, idiosyncratic activity patterns as user action identification profiles. A comparitor module identifies the current user by comparing the current user's detected activity pattern against one or more stored user action identification profiles. If the comparison is sufficiently close, the current user's identification is established. In one embodiment, once the current user's identification is established, either passively by the comparitor module, or actively by requesting specific user input (e.g., a password), the identification system updates the identified user's action identification profile. For example, the system updates the user's idiosyncratic input patterns as the user's taste in often-selected content changes or the user becomes more proficient in her manner of making frequently-entered input patterns.

In some embodiments the user identification system is wholly contained within the electronic device that the user is operating. Such all-in-one embodiments operate to, for example, prevent unauthorized use of the device. In other embodiments, the user identification system is placed at a central position (i.e., a "back-end") that is accessed by one or more user-operated electronic devices (i.e., "front-ends"). Such distributed embodiments also operate to prevent unauthorized use of associated systems or, for example, distinguish among several system users.

BRIEF DESCRIPTION OF DRAWINGS

The accompanying drawings, which are incorporated in and constitute a part of this specification, illustrate and explain embodiments of methods and apparatuses for determining an electronic device user's identity. In the drawings.

DETAILED DESCRIPTION

The following detailed description of the methods and apparatuses for determining the user's identity refers to the accompanying drawings. The detailed description illustrates embodiments of the methods and apparatuses for determining the user's identity and is not intended to construct limitations. Instead, the scope of the invention is defined by the claims.

Those skilled in the art will recognize that many other implementations are possible and are consistent with the methods and apparatuses for determining the identity of the user.

References to "content" includes data such as audio, video, text, graphics, and the like, that are embodied in digital or analog electronic form. References to "applications" includes user data processing programs for tasks such as word processing, audio output or editing, video output or editing, digital still photograph viewing or editing, and the like, that are embodied in hardware and/or software.

Figure 1:
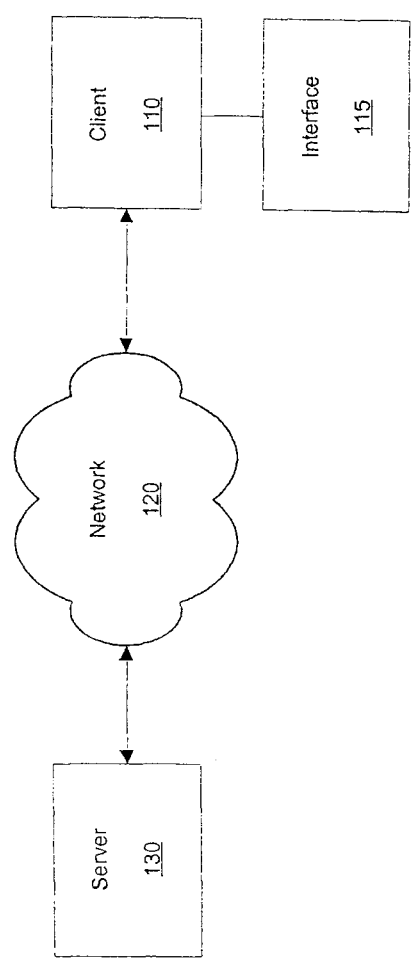
FIG. 1 is a diagram illustrating an environment within which the methods and apparatuses for determining the identity of the user are implemented.

FIG. 1 is a diagram illustrating an environment within which the methods and apparatuses for determining the identity of the user are implemented. The environment includes an electronic device 110 (e.g., a computing platform configured to act as a client device, such as a personal computer, a personal digital assistant, a cellular telephone, a paging device), a user interface 115, a network 120 (e.g., a local area network, a home network, the Internet), and a server 130 (e.g., a computing platform configured to act as a server).

In some embodiments, one or more user interface 115 components are made integral with the electronic device 110 (e.g., keypad and video display screen input and output interfaces in the same housing as personal digital assistant electronics (e.g., as in a Clie® manufactured by Sony Corporation). In other embodiments, one or more user interface 115 components (e.g., a keyboard, a pointing device (mouse, trackball, etc.), a microphone, a speaker, a display, a camera) are physically separate from, and are conventionally coupled to, electronic device 110. The user uses interface 115 to access and control content and applications stored in electronic device 110, server 130, or a remote storage device (not shown) coupled via network 120.

In accordance with the invention, embodiments of user identification as described below are executed by an electronic processor in electronic device 110, in server 130, or by processors in electronic device 110 and in server 130 acting together. Server 130 is illustrated in FIG. 1 as being a single computing platform, but in other instances is two or more interconnected computing platforms that act as a server.

Figure 2:
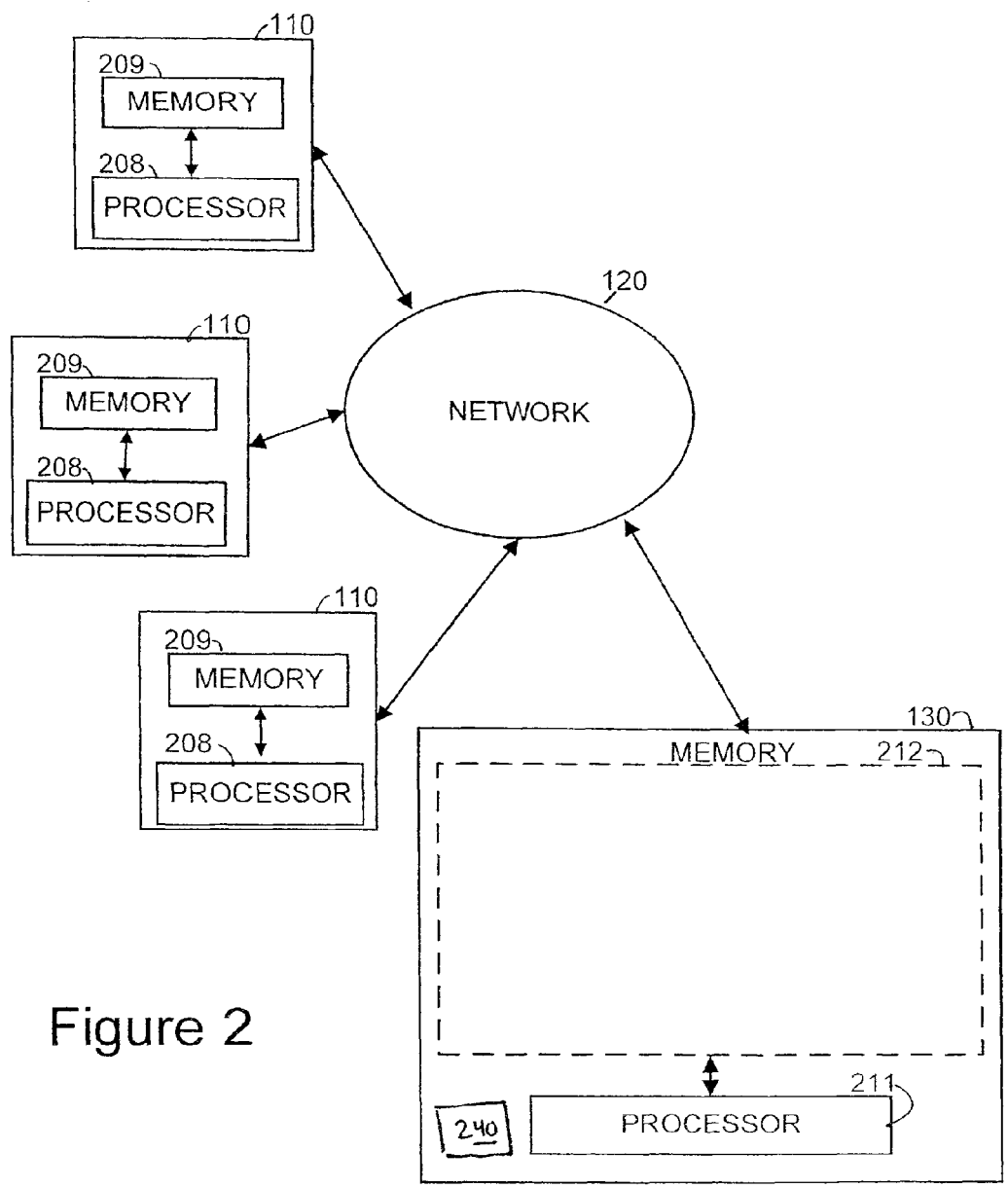
FIG. 2 is a simplified block diagram illustrating one embodiment in which the methods and apparatuses for determining the identity of the user are implemented.

FIG. 2 is a simplified diagram illustrating an exemplary architecture in which the methods and apparatus for determining the identity of the user are implemented. The exemplary architecture includes a plurality of electronic devices 110, server device 130, and network 120 connecting electronic devices 110 to server 130 and each electronic device 110 to each other. The plurality of electronic devices 110 are each configured to include a computer-readable medium 209, such as random access memory, coupled to an electronic processor 208. Processor 208 executes program instructions stored in the computer-readable medium 209. A unique user operates each electronic device 110 via an interface 115 as described with reference to FIG. 1.

Server 130 includes a processor 211 coupled to a computer-readable medium 212. In one embodiment, the server 130 is coupled to one or more additional external or internal devices or applications, such as, without limitation, a secondary data storage element, such as database 240.

In one instance, processors 208 and 211 are manufactured by Intel Corporation, of Santa Clara, Calif. In other instances, other microprocessors are used.

One or more user applications are stored in media 209, in media 212, or a single user application is stored in part in one media 209 and in part in media 212. In one instance a stored user application, regardless of storage location, is made customizable based on determining an identity of a user using embodiments described below.

The plurality of client devices 110 and the server 130 include instructions for a customized application for determining an identity of a user. In one embodiment, the plurality of computer-readable media 209 and 212 contain, in part, the customized application. Additionally, the plurality of client devices 110 and the server 130 are configured to receive and transmit electronic messages for use with the customized application. Similarly, the network 120 is configured to transmit electronic messages for use with the customized application.

Figure 3:
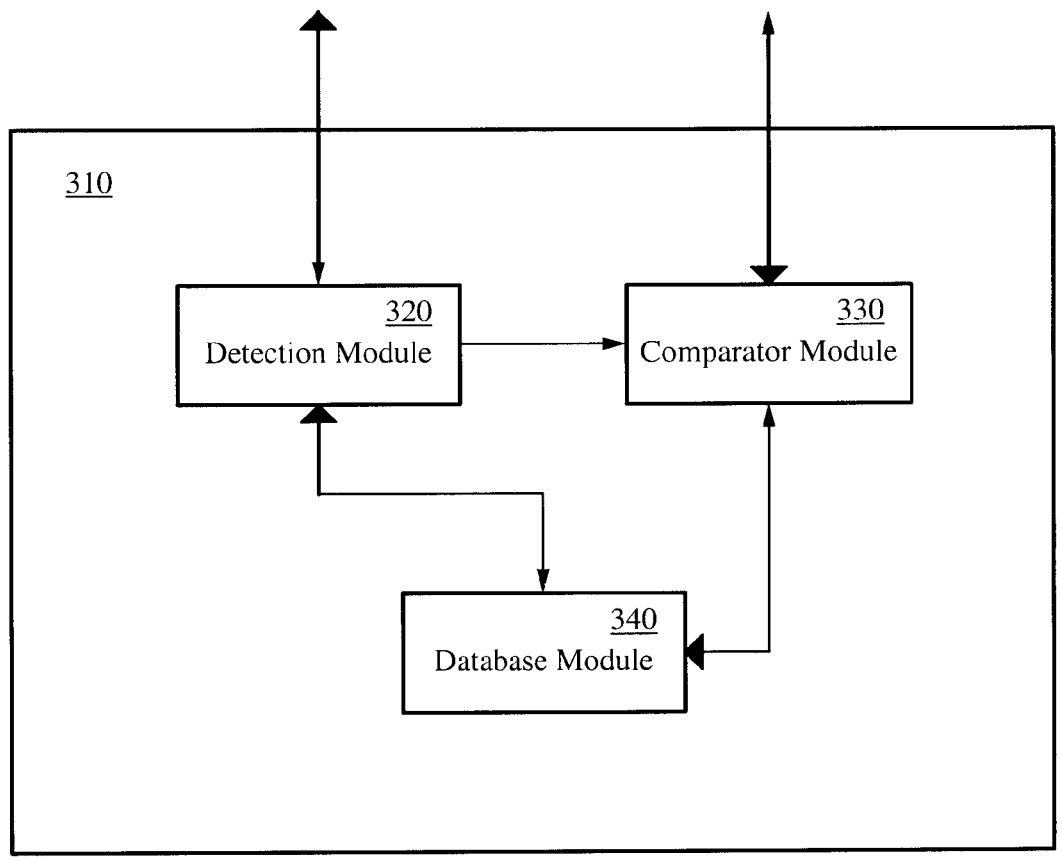
FIG. 3 is a simplified block diagram illustrating an exemplary embodiment of the methods and apparatuses for determining the identity of the user.

FIG. 3 is a simplified diagram illustrating one embodiment of a user identification module 310. In one embodiment, the user identification module 310 is configured to determine the identity of a particular user who is using electronic device 110 by examining the user's activity. In one embodiment, the user identification module 310 is embodied in electronic device 110. In another embodiment, identification module 310 is embodied in server 130. In yet another embodiment, identification module 310 is embodied, in part, in electronic device 110 and, in part, in server 130.

As shown in FIG. 3, the user identification module 310 includes a detection module 320, a comparator module 330, and a database module 340. Each of the modules 320, 330, and 340 are configured to communicate with each other.

Detection module 320 is configured to monitor the user's activity on electronic device 110. In one embodiment, detection module 320 senses one or more of the user's inputs and outputs on interface 115 (FIG. 1).

In one instance, for example, the detection module 320 is configured to sense activity performed by the user such as selection of various content items for output, applications for use, or various content or application categories (e.g., "rock music") for further selection via, for instance, a drop down menu. In some embodiments, the sensed user activity includes both the actual activity performed and the order in which particular activities are performed. In another instance, detection module 320 is configured to sense one or more times associated with the user's activity on electronic device 110. For example, detection module 320 determines a time interval between inputs (e.g., between two user menu selection inputs).

In one embodiment, the database module 340 is configured to store an action identification profile for a particular user. The action identification profile for the particular user includes, for example, a record of the activity (e.g., specific actions and order of actions) and activity time (e.g., intervals between actions) information associated with the particular user. That is, the user action identification profile is a record of the particular user's patterns of use for electronic device 110. In one instance, for example, the unique user action identification profile includes a record of web sites, which represents the user's unique website viewing habits. In another instance, the unique user action identification profile includes a number of content items that are frequently accessed by the user. In yet another instance, the unique user action profile includes an ordered sequence of actions frequently performed by the user.

In some embodiments, database module 340 stores two or more unique user action identification profiles, each profile being associated with a corresponding unique user so that each of several users of a single electronic device 110 can be identified.

In some embodiments, the database module 340 receives information associated with the one or more user's actions and action times via detection module 320.

In some embodiments, one or more stored user action identification profiles are refined after first being established so as to more accurately record information associated with a unique user's actions, and thereby making the stored action identification profile more accurate. In some instances, the user action identification profile refinement continuously occurs after, for example, the user's identity is confirmed to ensure that profile refinement is correct.

Comparator module 330 is configured to compare activity being performed by an electronic device 110 user against at least one user action identification profile stored by database module 340. In the embodiment shown in FIG. 3, for example, comparator module 330 receives information associated with a user's detected current actions via detection module 320 and user action profile information from database module 340. Comparator module 330 then determines the quality of a match between the received user current action information and the received user historical profile information. If the match quality is determined to be sufficient, comparator module 330 outputs data indicating that the current electronic device 110 user is identified as the user associated with the stored user action profile.

In some embodiments, the comparator module 330 uses a predetermined threshold score to determine the match quality between a particular user action identification profile and the activity(ies) currently being performed by a user. For example, comparator module 330 compares the current user's actions against a stored user action identification profile and scores the comparison. If the comparison score reaches or exceeds the predetermined threshold score, then comparator module 330 identifies the current user as being the user associated with the stored user action identification profile.

The duration of a user's current activity that is compared against a user action identification profile may last for a fraction of a second to several minutes prior to reaching the predetermined threshold score.

In another embodiment, the comparator module 330 receives information associated with a current user's activity for a predetermined length of time and identifies a particular user through a best match from the profiles within the database module 340. For example, based on the current user's activity performed by the user for the predetermined length of time, the comparator module 330 compares the user's current activity against stored user action identification profiles and selects the particular user having a profile that best resembles the current user's activity.

In various embodiments, any combination of predetermined threshold score and predetermined length of time are used to identify a particular user based on the user's activity.

The user identification module 310, the detection module 320, the comparator module 330, and the database module 340 are shown for illustrative purposes and are not intended to limit the scope of the methods and apparatuses for determining the identity of the user. Any number of these modules may be combined without departing from the scope of the methods and apparatus for determining the identity of the user. Further, additional modules may be added without departing from the scope of the methods and apparatus for determining the identity of the user.

Figure 4:
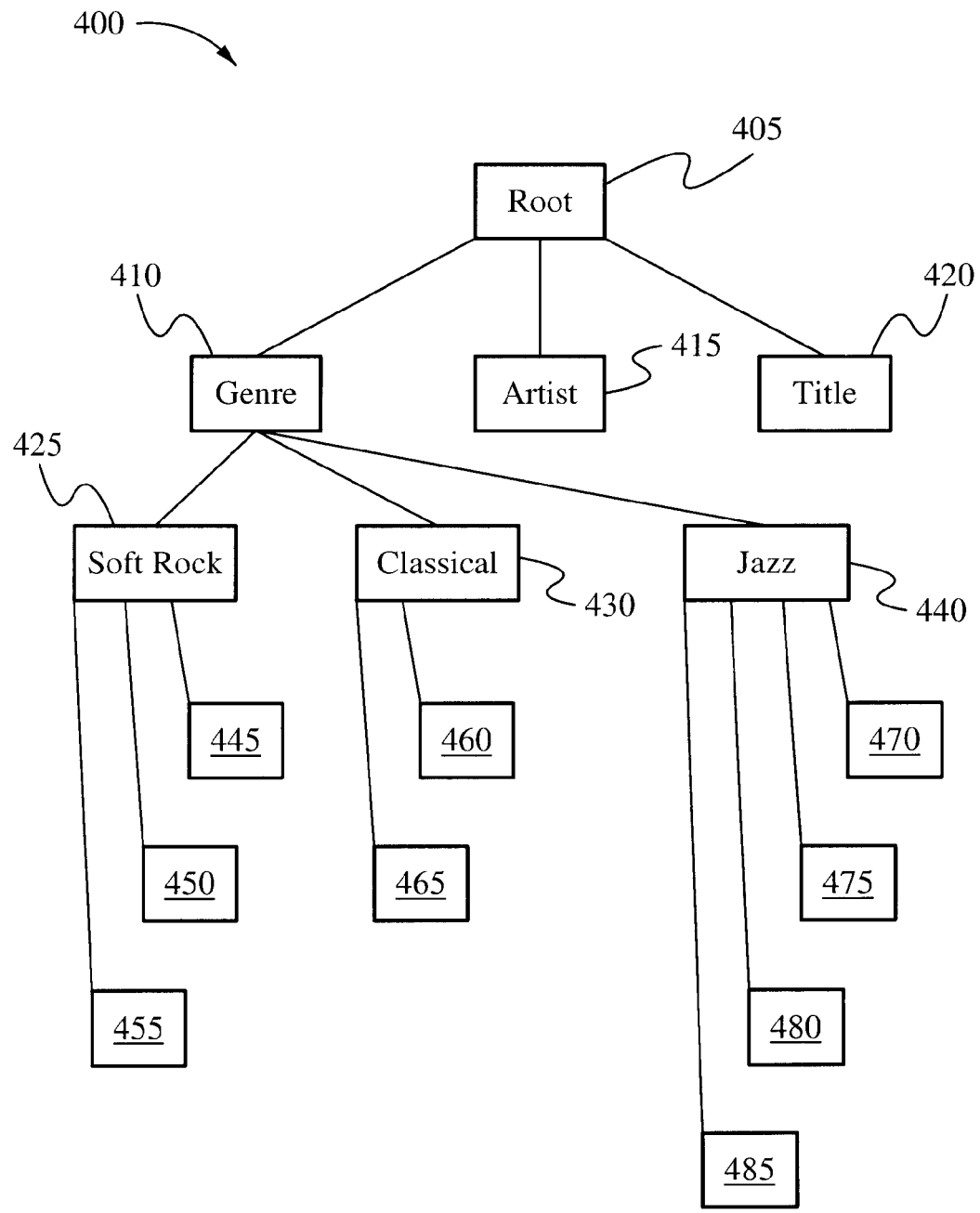
FIG. 4 is a simplified block diagram illustrating an exemplary selection option available to the user in which the methods and apparatus for determining the identity of the user are implemented.

FIG. 4 is an exemplary decision tree 400 for illustrating choices that shape the user's activity. In one embodiment, the type and manner of the user's activity as they navigate within this illustrative tree is utilized in determining the user's identity within the user identification module 310.

In one embodiment, the decision tree 400 illustrates choices that are navigated by a user when selecting a musical album. In other embodiments, the decision tree 400 provides a variety of options for the user, such as selecting particular applications and/or content, performing tasks in a specific order, and the like.

In one embodiment, the decision tree 400 is configured to allow the user to begin at a root 405 and to select among a genre category 410, an artist category 415, and an album title category 420.

In the embodiment illustrated in FIG. 4, the genre category 410 includes a soft rock genre 425, a classical genre 430, and jazz genre 440. If the user chooses the genre classification 410, the user is presented with further choice of the soft rock genre 425, the classical genre 430, and the jazz genre 440.

In one embodiment, there are multiple albums available to the user under each genre selection. For example, albums 445, 450, and 455 represent album selections available to the user when the user selects the soft rock genre 425. Similarly, albums 460 and 465 represent album selections available to the user when the user selects the classical genre 430. Albums 470, 475, 480, and 485 represent album selections available to the user when the user selects the jazz genre 425.

In use, selection of an album from the decision tree 400 illustrates a user's activity in selecting content. Further, the use of categories as shown within the decision tree 400 to select albums provides an exemplary illustration of a user's activity in selecting a category. Instead of selecting an album by first selecting the genre category, for example, a user may begin by first selecting the artist or title categories. Content items available for selection may, in some instances, be indexed within a single category, or in other instances may be indexed within two or more categories.

Figure 5:
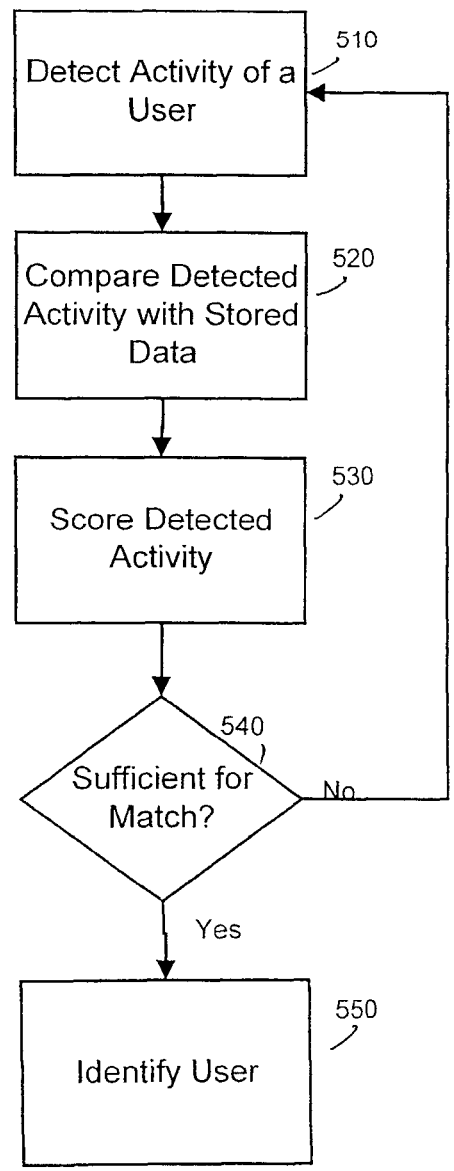
FIG. 5 is a flow diagram, consistent with embodiments of the methods and apparatuses for determining the identity of the user.
Figure 6:
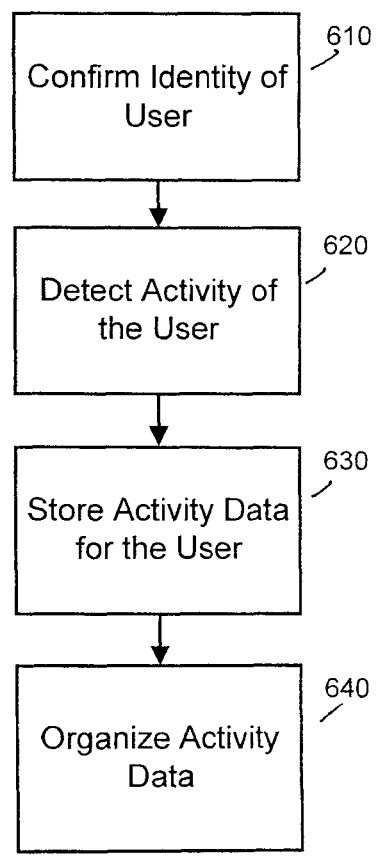
FIG. 6 is a flow diagram, consistent with embodiments of the methods and apparatuses for determining the identity of the user.

The flow diagrams as depicted in FIGS. 5 and 6 are exemplary embodiments of the methods and apparatuses for determining the user's identity.

The blocks within the flow diagrams can be performed in a different sequence without departing from the spirit of the methods and apparatus for determining the identity of the user. Further, blocks may be deleted, added, or combined without departing from the spirit of the methods and apparatuses for determining the user's identity.

FIG. 5 is a flow diagram that illustrates an embodiment in which the user's identity is determined by detecting the user's activity.

In Block 510, the user's activity is detected by, e.g., the detection module 320. In some embodiments, the user's activity is the user making selection choices, such as for content, applications, web sites, categories, and the like. In other embodiments, the user's activity is the user making a series of selection choices. By making a series of selection choices, the order of the selection choices are considered in addition to the selections themselves. For example, a distinction is made between a user's selection of the album 470 prior to selecting the album 465 and a user's selection of the album 465 prior to selecting the album 470. In yet another embodiment, the user's activity is the timing between inputs from the user. For example, the detected activities are varying length of time between inputs from the user as the user makes specific inputs (e.g., menu selections) or user interface 115.

There are a variety of ways that the user can make selections through the user interface 115. In some embodiments, the user utilizes a pointing device (e.g. mouse, track ball, joy stick) to make a selection. In other embodiments, the user utilizes a keyboard device to make a selection. In yet other embodiments, the user utilizes a microphone and a voice recognition system to make a selection.

In Block 520, the user's activity detected in 510 is compared with at least one user action identification profile accessed, e.g., via database module 340.

In Block 530, the user's detected activity is scored based on a comparison between the user's detected activity and a user action identification profile. In one embodiment, if the user's detected activity matches a portion of a user action identification profile, then this matching user action identification profile is attributed with an incremental, positive comparison score. In one example, with each instance the user's activity matches for a particular user action identification profile, the comparison score associated with the particular user action identification profile gains an additional, incremental score.

In Block 540, if there is not a sufficient amount of a user's detected activity data for a match, then additional user activity is detected in the Block 510. If there is a sufficient amount of detected activity data for a match, then a user's identity is determined in the Block 550.

In some embodiments, there are multiple ways to determine the sufficiency of the detected activity data to determine the user's identity such as having the comparison score reach the predetermined threshold score and finding a best match with user action identification profile after the predetermined length of time.

In one embodiment, a predetermined threshold score is utilized to determine the sufficiency of the detected activity data. In one instance, once the comparison score corresponding with a user action identification profile reaches or exceeds the predetermined threshold score, then there is sufficient detected activity data.

In one embodiment, the predetermined threshold score is established based on the number of user action identification profiles within the database module 340. For example, if there are a large number of user action identification profiles to select from within the database module 340, then the predetermined threshold score is set to a higher value to ensure a reasonable expectation of success in correctly determining the user's identity.

In another embodiment, the predetermined threshold score is established based on the importance of correctly determining the user's identity. For example, a higher value is assigned to the predetermined threshold score when determining the user's identity is important for reasons such as security and privacy.

In other embodiments, a predetermined length of time is utilized to determine the sufficiency of the detected user's activity data. For example, in one instance, once the predetermined length of time expires, then the detected user's activity data is deemed sufficient to determine the user's identity.

In one embodiment, the predetermined length of time is established based on the number of user action identification profiles within the database module 340. For example, if there are a large number of user action identification profiles to select from within the database module 340, then the predetermined length of time is set for a longer duration to ensure a reasonable expectation of success in correctly determining the user's identity.

In another embodiment, the predetermined length of time is established based on the importance of correctly determining the user's identity. For example, a longer duration is assigned to the predetermined length of time when determining the user's identity is important for reasons such as security and privacy.

In some embodiments, a predetermined threshold score is utilized to determine the sufficiency of the detected user's activity data. In other embodiments, a predetermined length of time is utilized to determine the sufficiency of the detected activity data. In yet other embodiments, any combination of a predetermined threshold score and a predetermined length of time may be utilized to determine the sufficiency of the detected user's activity data.

In Block 550, the user's identity is determined based on the comparison score corresponding to each of the user action identification profiles. In one instance, the user's identity corresponds with the user action identification profile having the highest comparison score for the user's activity data within the predetermined length of time. In another instance, the user's identity corresponds with the user action identification profile having the highest comparison score for the user's activity data within the predetermined length of time.

FIG. 6 is a flow diagram that illustrates how the collection of a user's activity data for a user action identification profile is advanced.

In Block 610, the user's identity is authenticated. In some embodiments, the user's identity is authenticated based on the highest comparison score for a user action identification profile which corresponds to the identified user as demonstrated in the Block 550 within FIG. 5. In other embodiments, the user's identity is independently confirmed based on a password, fingerprint, iris scan, personal identification number, and the like.

In Block 620, the confirmed user's activity is detected. In one embodiment, the user's activity is detected by the detection module 320.

In one instance, for example, the user's activity includes both the actual activity performed and the order in which particular activities are performed. In another instance, detection module 320 is configured to sense one or more times associated with the user's activity on electronic device 110. For example, detection module 320 determines a time interval between inputs (e.g., between two user menu selection inputs).

In Block 630, the user's activity data associated with the user's activity is stored. In some embodiments, the data corresponds to activity(ies) performed by a particular user and is associated with a corresponding user action identification profile.

In one embodiment, the user's activity data is stored within the database module 340 as a user action identification profile for the identified user. In one instance, the selection decisions performed by the identified user are stored as the user's activity data within the user action identification profile. For example, in one instance selection of the albums 475 and 465 by the identified user are stored as the user's activity data within the user action identification profile. In another instance, the selection order of the users decisions are stored in the user action identification profile. For example, in one instance the user's selection order of the albums 475 and 465 is stored in the user's activity data within the user action identification profile.

In Block 640, the user's activity data associated with the user action identification profile is organized. In some embodiments, the user's activity data is grouped according to the particular identified user. For example, activities performed by multiple users are grouped according to each user action identification profile. In another embodiment, the user's activity data is grouped according to the timing of when the user's activities are conducted. For example, activities performed by multiple users are grouped according to when these user activities were conducted by each respective user.

What is claimed:

1. A method programmed in a non-transitory memory of a device comprising:
    detecting a user's electronic device activity pattern, wherein the activity pattern comprises a plurality of separate application content selection activities;
    comparing the detected activity pattern against a plurality of user action identification profiles, wherein each user action identification profile is associated with a particular unique user; and
    using the comparing to identify the current user as being one of the particular users.

2. The method according to claim 1, wherein comparing the detected activity pattern comprises scoring a comparison between the detected activity pattern and a user action identification profile.

3. The method according to claim 1, wherein comparing the user activity pattern comprises scoring a comparison between the detected activity pattern and a user action identification profile, and wherein using the comparing comprises comparing the comparison score against a predetermined threshold score.

4. The method according to claim 1, wherein comparing the detected activity pattern comprises determining a number of matches between the detected activity pattern and the user action identification profiles, and wherein using the comparing comprises comparing the determined number of matches against a predetermined number of matches.

5. The method according to claim 1, further comprising the act of detecting additional activity of the current user if the act of using the comparing does not identify the current user.

6. The method according to claim 1, wherein the current user's electronic device activity includes selection of content.

7. The method according to claim 1, wherein the current user's electronic device activity includes selection of an application.

8. The method according to claim 1, wherein the activity of the user includes selection of a category.

9. The method according to claim 1, wherein the detected activity pattern includes a length of time between the current user's inputs on the electronic device.

10. The method according to claim 1, wherein the activity pattern comprises a website access pattern.

11. The method according to claim 1, wherein the activity pattern comprises frequently accessed content items.

12. The method according to claim 1, wherein the activity pattern comprises an ordered sequence of actions.

13. A system comprising:
    means for detecting a user's electronic device activity pattern, wherein the activity pattern comprises a plurality of separate application category selection activities;
    means for comparing the detected activity pattern against a plurality of user action identification profiles, wherein each user action identification profile is associated with a particular unique user; and
    means for using the comparing to identify the current user as being one of the particular users.

14. A method programmed in a non-transitory memory of a device comprising:
    comparing a user's activity pattern against a plurality of user action identification profiles, wherein each user action identification profile is associated with a particular unique user and wherein the current user's activity includes an input selection, wherein the input selection comprises a plurality of menu selection inputs;
    using the comparing to identify the current user as being one of the particular users.

15. The method according to claim 14, wherein comparing the current user's activity pattern comprises scoring a comparison between the detected activity pattern and a user action identification profile.

16. The method according to claim 14, wherein comparing the current user's activity pattern comprises scoring a comparison between the current user's activity pattern and a user action identification profile, and wherein using the comparing comprises comparing the comparison score against a predetermined threshold score.

17. The method according to claim 14, wherein comparing the current user's activity pattern comprises determining a number of matches between the current user's activity pattern and the user action identification profiles, and wherein using the comparing comprises comparing the determined number of matches against a predetermined number of matches.

18. The method according to claim 14, further comprising the act of detecting additional activity of the current user if the act of using the comparing does not identify the current user.

19. The method according to claim 14, wherein the input selection includes selection of content.

20. The method according to claim 14, wherein the input selection includes selection of an application.

21. The method according to claim 14, wherein the input selection includes selection of a category.

22. The method according to claim 14, wherein the current user's activity pattern includes a length of time between the current user's inputs.

23. The method according to claim 14, further comprising detecting the user's activity pattern.

* * * * *